(12) United States Patent
Mergen et al.

(10) Patent No.: US 8,826,026 B2
(45) Date of Patent: Sep. 2, 2014

(54) SYSTEMS AND METHODS FOR TRACKING ELECTRONIC FILES IN COMPUTER NETWORKS USING ELECTRONIC SIGNATURES

(75) Inventors: John-Francis Mergen, Baltimore, MD (US); Wesley E. Jordan, Alexandria, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1880 days.

(21) Appl. No.: 11/613,974

(22) Filed: Dec. 20, 2006

(65) Prior Publication Data
US 2008/0155263 A1 Jun. 26, 2008

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| H04K 1/00 | (2006.01) |
| H04L 9/00 | (2006.01) |
| H04L 9/30 | (2006.01) |
| H04L 9/32 | (2006.01) |
| G06F 21/10 | (2013.01) |
| H04L 29/06 | (2006.01) |

(52) U.S. Cl.
CPC ...... *H04L 9/3247* (2013.01); *G06F 2221/0737* (2013.01); *H04L 63/123* (2013.01); *G06F 2221/2101* (2013.01); *G06F 21/10* (2013.01)
USPC ................ 713/180; 713/176; 726/22; 380/30

(58) Field of Classification Search
CPC ..... H04L 9/3247; H04L 9/3263; H04L 63/12; H04L 63/123; H04L 63/126; H04L 12/5885; H04L 29/08675; H04L 67/22; G06F 21/64; G06F 2221/0737; G06F 2221/074; G06F 21/16
USPC ......... 713/176–180, 150–153, 165, 167, 171, 713/187, 189, 193–194; 726/22–30; 380/28–30
See application file for complete search history.

(56) References Cited

U.S. PATENT DOCUMENTS

| | | | | |
|---|---|---|---|---|
| 6,047,374 | A * | 4/2000 | Barton | 713/150 |
| 7,123,718 | B1 * | 10/2006 | Moskowitz et al. | 380/205 |
| 2002/0091927 | A1 * | 7/2002 | Wall | 713/176 |
| 2003/0115448 | A1 * | 6/2003 | Bouchard | 713/153 |
| 2004/0143740 | A1 * | 7/2004 | Tsai | 713/176 |
| 2004/0153648 | A1 * | 8/2004 | Rotholtz et al. | 713/176 |
| 2006/0015731 | A1 * | 1/2006 | Lakshmi Narayanan | 713/176 |

* cited by examiner

*Primary Examiner* — Philip Chea
*Assistant Examiner* — Trong Nguyen (57) ABSTRACT

Systems and methods are provided for tracking electronic files in computer networks using electronic signatures. A signature program installed on a network node inserts an electronic signature into certain encoded media files when they are transferred to other network users. Each network user is issued a unique electronic signature based on public key infrastructure. A signature repository supplies the recipient signature to the signature program prior to transferring a file. The sender and recipient signatures are appended to a portion of the media file, preferably the lower order bits to minimize perceptible file degradation. A transaction record is thereby written into the file and a copy of the transfer information is stored centrally at the repository, thereby creating a traceable record of a file's movement.

21 Claims, 7 Drawing Sheets

(Sender Signature + Sequence Number + Media File CheckSum)$_{Private^*}$ + (Receiver Signature)$_{Public^{**}}$ + Sequence Number \* Private is the Private Key Encryption Action
\*\* Public is the Public Key Encryption Action

SYSTEMS AND METHODS FOR TRACKING ELECTRONIC FILES IN COMPUTER NETWORKS USING ELECTRONIC SIGNATURES

BACKGROUND INFORMATION

With pervasive electronic communications networks now becoming ubiquitous, electronic files can be rapidly transmitted within an organization's network and even across geographically distributed networks such as the Internet. By simply forwarding an electronic mail message, electronic files can be rapidly distributed to many persons with only a few key strokes or mouse clicks. In the business world, as well as in academic and government network environments, this ability to rapidly transfer data has greatly accelerated productivity.

A consequence of this ability to rapidly distribute electronic information is that unintended and/or unauthorized release of proprietary, confidential, or otherwise non-public data files can easily occur. This type of unintended and/or unauthorized release can range from inadvertently forwarding an email message, to a deliberate release of confidential or proprietary information to competitors, press members or other unauthorized recipients. Once such a release has occurred, large amounts of resources may be expended trying to determine how the information escaped so that future releases may be avoided. However, it is often quite difficult to determine who is responsible for the "leak" and how that person obtained the information to begin with, that is, the path the information followed to get to that person.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF THE PREFERRED EMBODIMENTS

The following description is intended to convey a thorough understanding of the embodiments described by providing a number of specific embodiments and details involving encryption-based tracking of electronic file transfers. It should be appreciated, however, that the present disclosure is not limited to these specific embodiments and details, which are exemplary only. It is further understood that one possessing ordinary skill in the art, in light of known systems and methods, would appreciate the use of the inventions for its intended purposes and benefits in any number of alternative embodiments, depending upon specific design and other needs.

At least one embodiment of the disclosure may provide a method of tracking electronic files. The method according to this embodiment may comprise receiving a request to electronically transfer an electronic file from a first user to a second user, invoking a file tracking program, performing a tracking operation on the electronic file with the file tracking program, and transferring the electronic file to the second user via a computer network after the tracking operation is complete.

At least one other embodiment according to the disclosure may provide a system for tracking transfers of electronic files. The system according to this embodiment may comprise an encryption signature repository, and a file tracking program, wherein the file tracking program is configured to encode signature information obtained in part from the encryption signature repository in a portion of an outbound electronic file.

Another embodiment according to the disclosure may provide a method of tracking transfers of electronic files over a computer network. The method according to this embodiment may comprise receiving a request to transfer an electronic file, sending a request to an encryption signature repository for an encryption signature associated with an intended recipient of the electronic file, receiving the encryption signature associated with the intended recipient and appending the signature as electronic signature information onto a portion of the electronic file prior to transferring the file to the intended recipient, and sending the electronic signature information to the encryption signature repository to be stored in association with identification information corresponding to the electronic file.

As used herein, the terms "files" and "electronic files" will be used to refer to any type of electronic file, regardless of format. In a preferred embodiment, a file may comprise a media file, such as an audio file (MP3, WAV. etc.), a video file (MPEG, QuickTime, RealPlayer, etc.), a graphic image file (JPEG, GIF, etc.), or other digital encoding.

As used herein, the term "transfer" will be used to refer to any type of electronic file transfer from a user at a first network node to a second network node. In a preferred embodiment this may comprise an email attachment. However, this may also comprise file transfer protocol (FTP), TELNET, a file sharing protocol, a chat program or a browser-based mail client.

Figure 1:
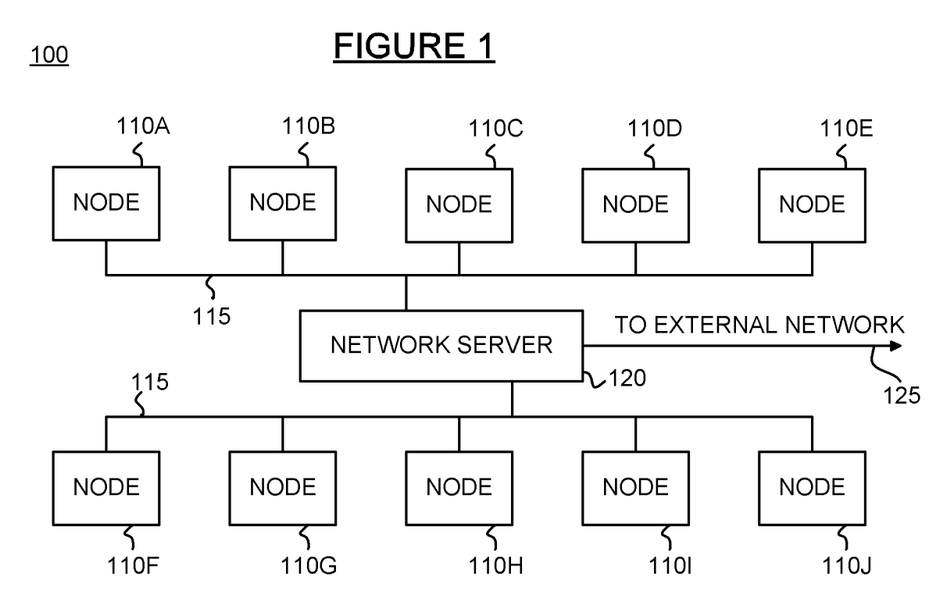
FIG. 1 is a schematic diagram of an exemplary computer network topology usable with one or more embodiments of the disclosure.

Referring now to FIG. 1, a schematic diagram of an exemplary topology of a computer network 100 usable with one or more embodiments of the disclosure is depicted. The network 100 of FIG. 1 may include a plurality of network nodes 110A-110J connected to a network server 120 via a local network 115. Each node 110A-110J may comprise a desktop computer system, laptop computer system, PDA or other wired and/or wireless computing device. The network 100 may be a network in a business, government agency, educational institution, or other entity. In such a network 100, one or more local area networks (LANs) 115 may interconnect the various nodes 110A-110J so that they can communicate with each other (either peer-to-peer or though the server 120) and to outside networks, such as a wide area network (WAN) like the Internet.

The network 100 may include one or more network servers 120 that provide network functionality to the various nodes 110A-110J and may also serve as a gateway to external networks via connection 125, thereby enabling any node to communicate with any other node and/or servers accessible by the external network connection 125. As discussed above, in such a network, electronic files are easily moved around from node to node and even outside of the network 100 to nodes not associated with the network 100, such as, for example, by attaching them to an electronic mail message.

Figure 2:
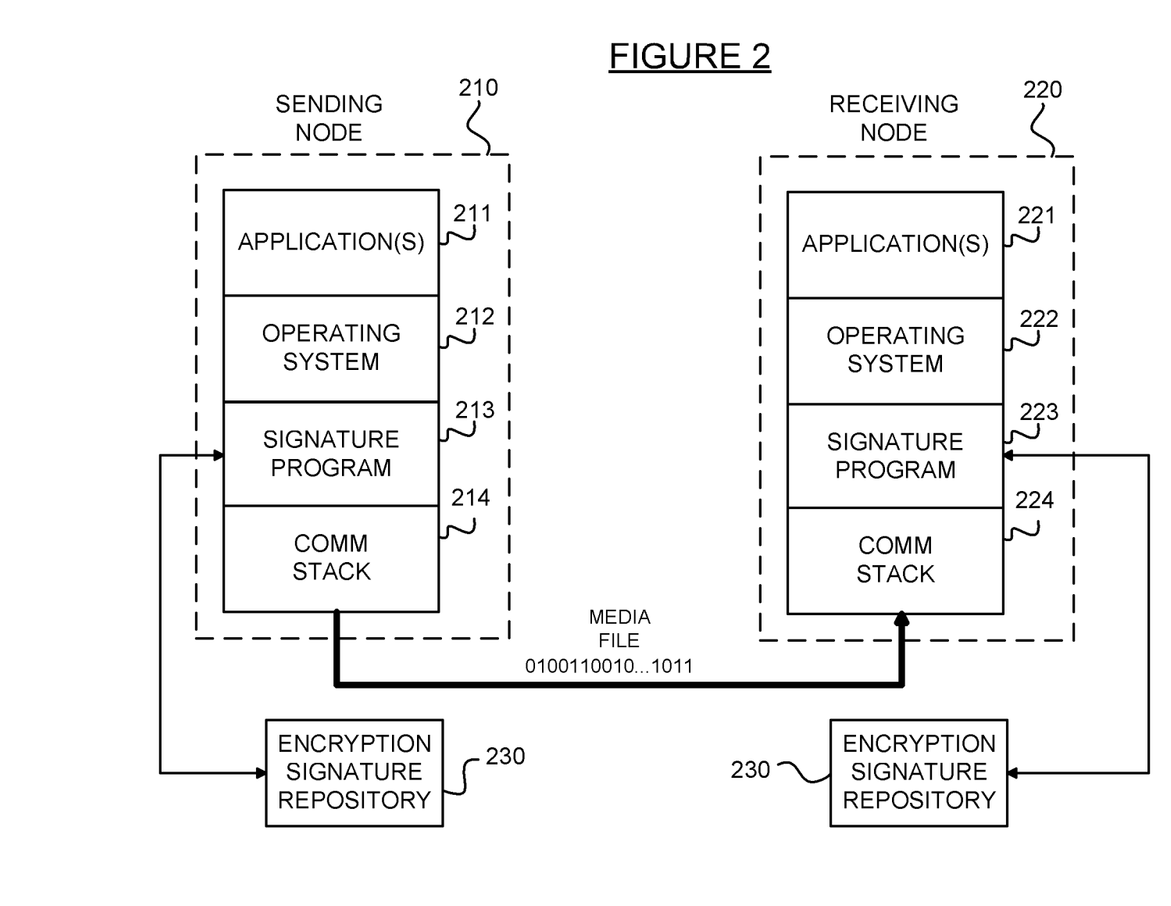
FIG. 2 is a schematic diagram of an exemplary system for tracking electronic file transfers in a computer network using electronic signatures according to at least one embodiment of the disclosure.

Referring now to FIG. 2, this Figure is a schematic diagram of an exemplary system for tracking electronic file transfers in a computer network using electronic signatures according to at least one embodiment of the disclosure. In FIG. 2, a sending node 210 is configured to transfer an electronic file to a receiving node 220 while appending electronic signature information to the file. The sending node 210 may comprise a computer system including one or more applications 211 running on an operating system 212 such as Windows, Unix, Linux, MacOS, etc. An electronic signature program 213 may interface between the operating system 212 and an encryption signature repository 230. The encryption signature repository may comprise a database or other data structure stored in an a computer readable format. In various embodiments, this signature program 213 may operate autonomously, that is, without active invocation by a user of the sending node 210. When a user of the sending node 210 sends or forwards an email containing an electronic file, such as, for example, a media file, the signature program 213 may append electronic signature information to a portion of the file. In a preferred embodiment, this electronic signature information may be appended to lower order bits of the file so that the affect is indiscernible to a user playing, viewing, or listening to the file, that is, it causes little or no degradation to the file. Furthermore, in a preferred embodiment, this electronic signature information may include a combination of public and private keyed encryption data identifying the sender and/or sending node and receiver and/or receiving node.

In various embodiments, the signature program 213 may connect to an encryption signature repository 230 to obtain an electronic encryption signature for one or more recipients of the electronic file. The encryption signature repository 230 may return the requested signature(s) to the signature program 213. The encryption program 213 may append an electronic signature, including the returned recipient signature as well as a signature of the sender in a portion of the electronic file, such as in the lower order bits. In a preferred embodiment, if one or more transfer records have already a been recorded in the file, the current operation will "slide" those records down the list so that a chronological list from most recent to least recent may be preserved, to the extent that space is available within the allocated lower order bits. In a preferred embodiment, the signature program 213 may also encode a transfer sequence number in the electronic signature in two places using the sender and recipient signatures respectively, thereby preventing a recipient from "removing" themselves from the transactional log, as is discussed in greater detail in the context of FIG. 7.

In the example of FIG. 2, once the electronic signature has been appended, the electronic file may be transferred to the receiving node 220 through the sending node's communication stack 214, such as a TCP-IP stack as is well known. The receiving node 220 may comprise a computer system including one or more applications 221 running on an operating system 222. The receiving node 220 may also comprise a communication stack 224 for receiving the electronic file from the sending node 210. When the file is received at the receiving node 220, the signature program 223 at that node 220 may modify the receiver's electronic signature in the file to reflect that the receiver has received the file. In a preferred embodiment, each node and/or each user on the network 100 may be issued a unique signature. In various embodiments, this signature may be based on public key infrastructure (PKI) cryptography.

When the electronic file is transferred from the receiving node 220 to another node the receiving node may invoke the signature program 223 and perform another electronic signature process as discussed in the context of sending node 210, that is, the receiving node will effectively become a sending node.

In a preferred embodiment, a transfer record may be maintained at the encryption signature repository 230 so that each time a document is transferred and "touched" the record is updated. In this way, the network path taken by an electronic file may be easily identified—the file itself may contain this information as well a record stored on the encryption signature repository 230. This method requires far less space than storing the entire file each time a transfer occurs. Also, although a single repository 230 is identified in FIG. 2, there may be multiple repositories either in communication with one another, or maintaining separate or duplicative records.

Figure 3:
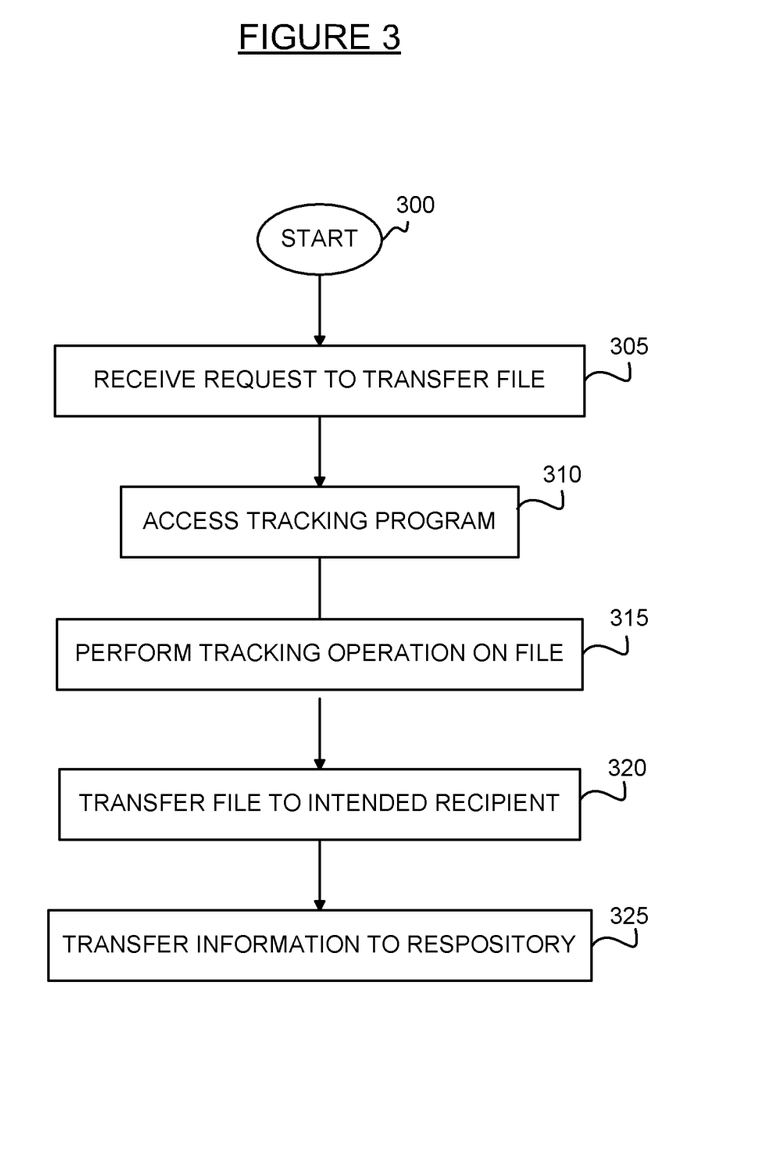
FIG. 3 is a flow chart of an exemplary method for tracking electronic file transfers according to at least one embodiment of the disclosure.

FIG. 3 is a flow chart of an exemplary method for tracking electronic file transfers according to at least one embodiment of the disclosure. The method begins in block 300. In block 305 a request to transfer a file is received. In various embodiments, this may comprise a user attempting to attach a file to an electronic mail message or to access a file via an application adapted to transfer files (i.e., a chat application, an FTP application, a TELNET application, browser-based mail application, or other suitable application).

In block 310, an electronic signature tracking program (also referred to as a signature program) is accessed. This program may be automatically invoked by the operating system or the application in response to a user command to transfer a file. Alternatively, this program may be running the background, that is, automatically started by the operating system when the device is turned on. Operation of this program may, in some embodiments, be completely transparent to the user. Alternatively, or in addition, a pop-up style menu may appear inviting the user to open the signature tracking application.

In block 315 a tracking operation is performed on the electronic file. As discussed above in the context of FIG. 2, in various embodiments, this may comprise obtaining an electronic signature of the intended recipient from a signature repository. This may also comprise appending the signature along with a signature of the sender in a portion of the electronic file, such as in lower order bits of the file. This may further comprise appending a sequence number for the transfer transaction in two places using the sender's and the recipient's encryption keys. The sequence number may be used to separately identify the file transfer operation, that is who transferred and who received the file.

In block 320, the file is transferred to the intended recipient using the specified application and corresponding protocol. For ease of illustration, in FIG. 2, this is shown as a direct transfer, that is peer-to-peer. It should be appreciated that the transfer may also be performed indirectly, that is, through one or more server computers, access points, routers, or other network equipment, as is well known. When the file reaches the destination, an electronic signature program may decode the signature file using a key of the sending machine. In various embodiments, the program may modify the signature to reflect that the file has been "touched" by the recipient. In block 325, data may be sent to a file or other data structure located at the information repository so that a transactional record of the file transfer may be maintained. This record may be indexed by a sequence number, file identifier, sender signature, recipient signature, or other field.

Figure 4:
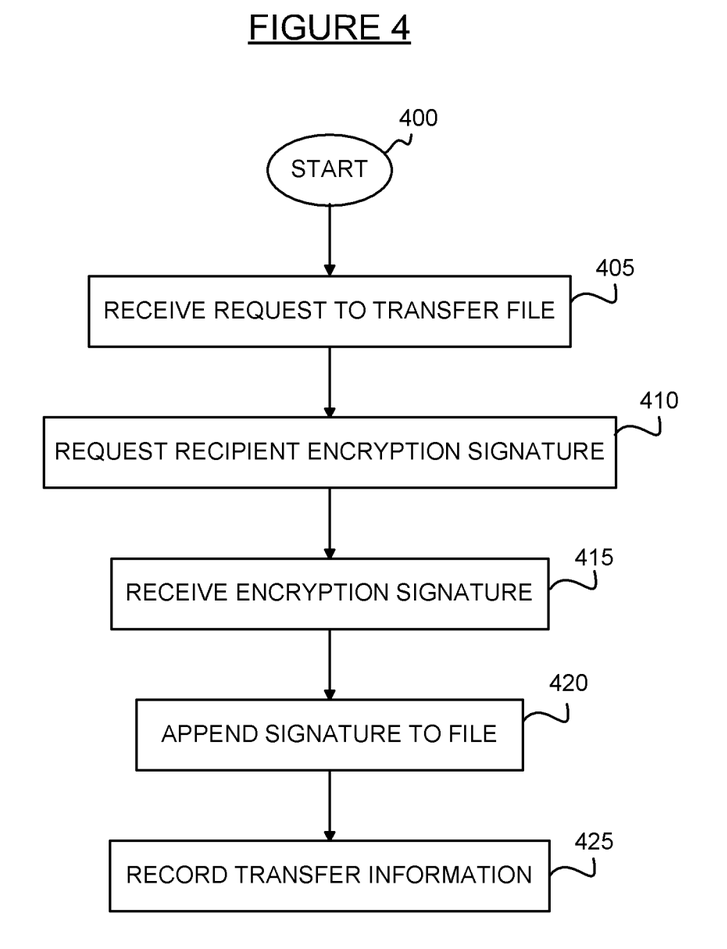
FIG. 4 is a flow chart of an exemplary method of performing a file tracking operation with an electronic signature program according to at least one embodiment of the disclosure.

FIG. 4 is a flow chart of an exemplary method of performing a file tracking operation with an electronic signature program according to at least one embodiment of the disclosure. The exemplary method of FIG. 4 is described with respect to the operations performed by the electronic signature tracking program component of the tracking system according to the various embodiments of the disclosure. The method begins in block 400. In block 405, a request to transfer an electronic file is received by the program. In various embodiments, this may be caused by a user and/or user application attempting to attach an electronic file, such as, for example, a media file to an electronic mail message. In other embodiments, this may be initiated in response to a user command such as a send or transfer command issued through a user application running on the same computing device as the signature program. In block 410, the signature tracking program may request an electronic signature of one or more designated recipients of the electronic file. In various embodiments, the program may extract this information automatically from the mail message or from elsewhere in the application used by the operator to transfer the file. This may comprise electronically submitting a request to the signature repository including one or more identification fields for each recipient. In block 415, the signature tracking program may receive encryption nag In block 420 the program may append the electronic signature to the file to be transferred. As discussed above, this may comprise appending a transfer record including the sender's electronic signature, the recipient's electronic signature, and a sequence number to a portion of the file. In a preferred embodiment, the sequence number may be encoded using two different encryption keys so that the recipient is unable to completely remove the record of their having received the file from the appended records in the file. In block 425, the transfer information may be recorded. As discussed above, this may comprise sending a copy of the electronic signature information that was appended to the file to the signature repository so that a separate record of the transfer may be stored centrally in case it becomes necessary to track the source of an unintended or unauthorized file release.

Figure 5:
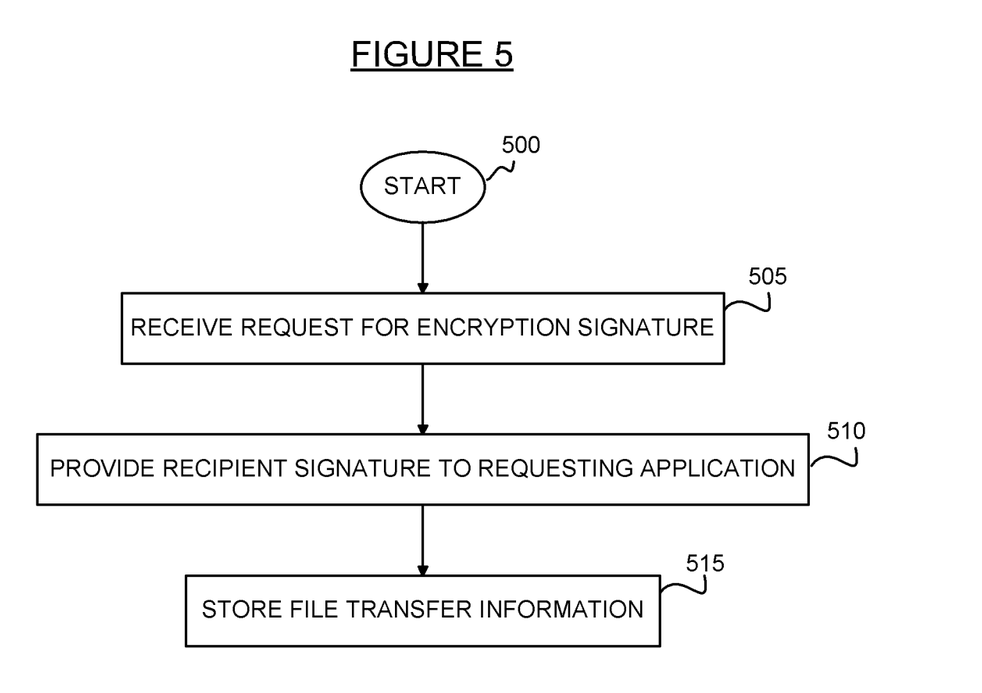
FIG. 5 is a flow chart of an exemplary method of performing a document tracking operation with a centralized encryption signature repository according to at least one exemplary embodiment.

Referring now to FIG. 5, this Figure is a flow chart of an exemplary method of performing a document tracking operation with a centralized electronic signature repository according to at least one exemplary embodiment. The exemplary method of FIG. 5 is described with respect to the operations performed by the signature repository component of the tracking system according to the various embodiments of the disclosure. The method begins in block 500 and proceeds to block 505 where a request for one or more recipient electronic signatures is received. The request may include an identifier for each requested signature that can be used to index the repository for corresponding signatures. In block 510, the one or more requested signatures are provided to the requesting application, such as, for example the signature program discussed in the context of FIG. 4. In block 515, the transfer information may be stored in the repository. As discussed above, in various embodiments, the signature program on the sending and receiving devices may send information to the repository when an electronically signed file has been transferred and again when it is received and/or opened. In a preferred embodiment, this information is stored at the repository in a database, table or other suitable data structure that can be indexed and searched in the event of file leak. This data structure may store information fields including the actual signature appended to the file, identification information corresponding to the file, the sender's signature, the recipient's signature, the sequence number, the time and/or date of the transfer, and any other suitable fields associated with the transfer.

Figure 6:
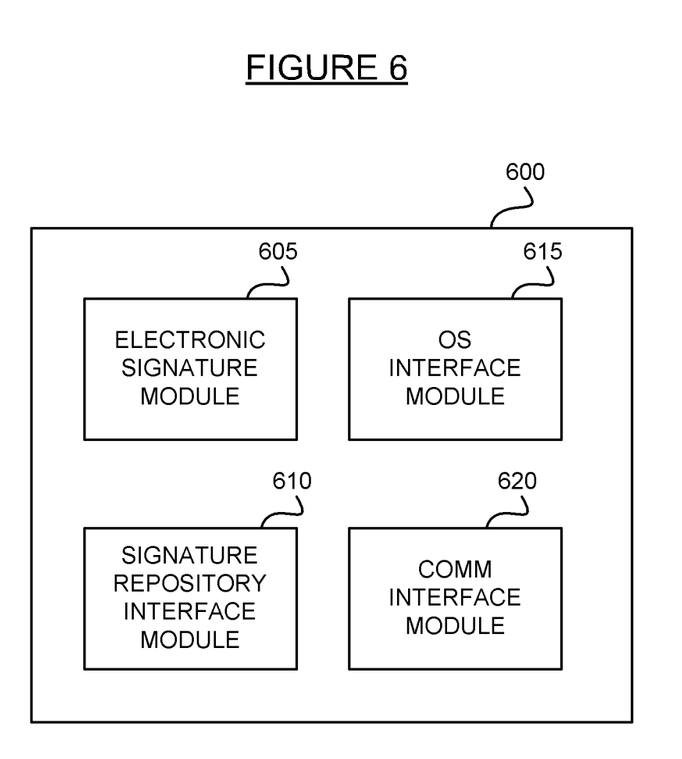
FIG. 6 is a block diagram illustrating exemplary components of an electronic signature-based file tracking system according to at least one embodiment of the disclosure.

FIG. 6 is a block diagram illustrating exemplary components of an electronic signature-based file tracking program 600 utilizing public key encryption according to at least one embodiment of the disclosure. As discussed above, in various embodiments, the program 600 may be installed on each of a plurality of network computer systems (nodes), such as nodes 110A-110J in FIG. 1 and nodes 210 and 220 in FIG. 2. Also, the program 620 may be stored on one or more centralized network computer systems such as server 120 depicted in FIG. 1. The program may be written in one or more of a variety of programming languages and/or environments such as C, C++, Visual Basic, Java, Unix, Fortran, or other suitable programming environment. In various embodiments, different versions may be utilized by nodes that are running different operating systems. The program 600 may comprise various modules which may provide functionality that enables certain files to be encoded with electronic files with electronic signature information identifying the sender and recipient of the file and to maintain a centralized repository of such information.

In the example of FIG. 6, the program 600 comprises an electronic signature module 605, a signature repository interface module 610, an operating system interface module 615 and a communication interface module 620. It should be appreciated that although in the preferred embodiment, each module may comprise components of a software-based program, each module may also be configured as separate software applications executing on computer hardware, one or more application specific integrated circuits (ASICs), a combination of hardware and software, or other suitable configuration. Moreover, one or modules may be combined or broken into multiple additional modules. Also, additional and/or different modules than those shown in FIG. 6 may be utilized.

In various embodiments, the electronic signature module 605 may comprise one or more application program interfaces (APIs) for interfacing with one or more user applications. As discussed above, the electronic signature module 605 may be invoked automatically whenever a compatible user application requests to attach or transmit a particular type of electronic file. The operating system (OS) interface module 615 may permit the interface program 600 to utilize the OS's existing communication stack and access drivers to access one or more electronic signature repositories. In various embodiments, the OS interface module 615 may be specific to a particular operating system, such as for example, WINDOWS, LINUX, MAC OS, or other suitable operating system. In other embodiments, the OS interface module 615 may be usable with a plurality of different operating systems—that is, it may comprise program code for performing redundant communication functions with a plurality of different operating systems.

The signature repository interface module 610 may interact with a centralized electronic signature repository located remote to each network node, for example, at an organization's server, such as the server 120 in FIG. 1. During a file transfer operation, the signature program 600 may utilize the signature repository interface module 610 to access the signature repository 230 to obtain the electronic signature for the recipient. As discussed above, in a preferred embodiment, each user on the network may be assigned a unique electronic signature and all the assigned signatures may be maintained in a table or other data structure in the signature repository. The signature repository interface module 610 may provide identification information obtained from a requesting application by the electronic signature module 605 in a request to the repository. The signature repository interface module 610 may further receive a response including the electronic signature for the recipient, and provide this electronic signature to the electronic signature module 605. The electronic signature module 605 may create the electronic signature using the recipient's signature, the sender's signature, and a sequence number. In various embodiments, the sequence number may be provided to the repository interface module 610 in response to the signature request. In other embodiments, the sequence number may be generated by the program 600, that is, locally, at the user's device. When the signature module 605 has encoded the electronic signature to the file, the communication interface module 620 may instruct the operating system's communication stack to initiate, i.e., permit the file transfer.

It should be appreciated that the particular modules illustrated in FIG. 6 are exemplary only and should not be construed as either necessary or exhaustive. In various embodiments, it may be desirable to use more, less or even different modules than those illustrated in FIG. 6.

Figure 7:
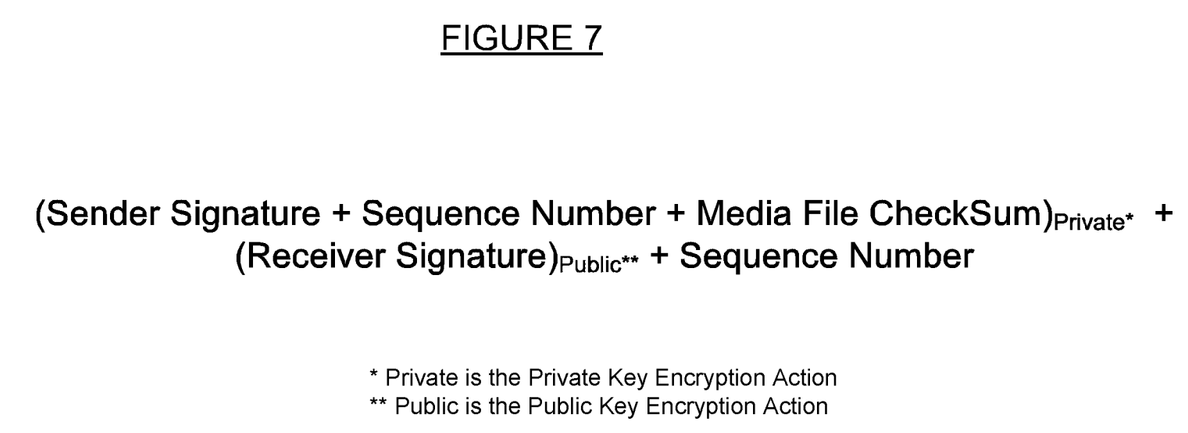
FIG. 7 is an exemplary electronic signature sequence according to at least one embodiment of the disclosure.

FIG. 7 is an exemplary electronic signature sequence that is appended to an electronic file prior to transfer from a first user to a second user according to at least one embodiment of the disclosure. In the example of FIG. 7, the electronic signature appears in the form of two separately encoded groups and a non-coded sequence number. The first group comprises the sender's electronic signature, the sequence number and the media file checksum—a summation of the bits making up the file. In the preferred embodiment, this group of data may be encoded using the sender's private encryption key so that this information can not be deciphered and therefore changed by the recipient. The second group of data is simply the recipient's electronic signature which is encoded using the public encryption key. In various embodiments, this portion of the signature may be modified by the recipient once the recipient accesses the file. The sequence number may be appended separately. By encoding the sequence number separately in two places, that is the sequence signature and the current number, removal of a sequence number can be detected because it requires the sender to encode the sequence number. Also, even if layers of the electronic signature are removed, verification of a file's movement can be provided by copies of the electronic signature data stored at the repository. If the low order bits of a particular file are exhausted from appending the maximum number of electronic signatures, the process may start over from the start of the file.

A key feature of the various embodiments of the disclosure is that a transfer record of the path traveled by certain types of electronic files, in particular media files, can be encoded directly in such files. Another feature of the various embodiments of the disclosure is that a transactional record of a file's movement within a network may be maintained with relatively low storage and processing overhead. As a result, removing a signature from the document alone will not destroy the record of the document's movement. Accordingly, a highly accurate means of establishing the source of a file's unintentional and/or unauthorized transfer may be implemented with relatively little modification to existing systems and infrastructure.

In the preceding specification, various preferred embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than a restrictive sense.

The invention claimed is:

1. A computer implemented method comprising:
receiving a request, via a computer network, to electronically transfer an electronic file from a sending node comprising a first computer system to a receiving node comprising a second computer system;
accessing a file tracking program;
performing a tracking operation on the electronic file with the file tracking program, wherein the performing a tracking operation on the electronic file with the file tracking program comprises encoding a portion of the electronic file with an electronic signature information of the sending node including public and private keyed encryption data of the sending node and an electronic signature information of the receiving node including public and private keyed encryption data of the receiving node; and
transferring, using the first computer system, the electronic file having the electronic signature information of the sending node and the electronic signature information of the receiving node to the receiving node via the computer network.

2. The method according to claim 1, wherein receiving a request to electronically transfer an electronic file comprises receiving a request to attach a file to an electronic mail message.

3. The method according to claim 1, wherein receiving a request to electronically transfer an electronic file comprises identifying at the sending node an outbound electronic mail message including an electronic file attachment.

4. The method according to claim 1, wherein accessing a file tracking program comprises automatically calling a file tracking program into active memory.

5. The method according to claim 1, wherein encoding a portion of the electronic file comprises modifying lower order bits of the electronic file with electronic signature information.

6. The method according to claim 1, wherein encoding a portion of the electronic file with an electronic signature information of the sending node and an electronic signature information of the receiving node comprises appending a sequence number to a portion of the electronic file such that the appended sequence number precedes any previously appended sequence number in an order of appending.

7. The method according to claim 6, wherein encoding a portion of the electronic file with an electronic signature information of the sending node and an electronic signature information of the receiving node comprises accessing an encryption signature repository to obtain the electronic signature information of the receiving node.

8. The method according to claim 6, wherein encoding a portion of the electronic file with an electronic signature information of the sending node and an electronic signature information of the receiving node comprises appending the electronic signature information of the sending node with the sequence number.

9. The method according to claim 1, further comprising storing information corresponding to the tracking operation on a remote data server with the file tracking program.

10. The method according to claim 9, wherein storing information corresponding to the tracking operation on a remote data server comprises storing information including an encryption signature of the sending node, an encryption signature of the receiving node and a sequence number for the transfer.

11. The method according to claim 1, wherein the electronic file is an electronic media file selected from the group consisting of an audio file, a video file, an image file, an executable file and a digital encoding of an analog signal.

12. The method according to claim 1, wherein performing a tracking operation comprises performing an operation based on public key infrastructure (PKI).

13. A system comprising:
an encryption signature repository comprising a database;
a hardware computer processor;
a file tracking program executed by the hardware computer processor, wherein the file tracking program is configured to encode electronic signature information of a sending node including public and private keyed encryption data of the sending node and electronic signature information of a receiving node including public and private keyed encryption data of the receiving node obtained in part from the encryption signature repository in a portion of an outbound electronic file, and
a communication stack configured to transmit the outbound electronic file having the electronic signature information of the sending node and the electronic signature information of the receiving node via a communication network.

14. The system according to claim 13, wherein the file tracking program comprises computer readable code stored in a non-transitory computer readable storage medium that is automatically invoked when the sending node attempts to transmit an electronic file to the receiving node via the communication network to cause a computer to perform a file tracking operation.

15. The system according to claim 14, wherein the file tracking operation comprises electronically requesting and subsequently obtaining the electronic signature information of the receiving node from the encryption signature repository.

16. The system according to claim 14, wherein the file tracking operation further comprises appending the electronic signature information of the sending node and the electronic signature information of the receiving node to a portion of the electronic file.

17. The system according to claim 16, wherein appending the signature information of the sending node and the electronic signature information of the receiving node comprises appending an encryption signature of the sending node, an encryption signature of the receiving node, and a unique sequence number to a portion of the electronic file.

18. The system according to claim 17, wherein appending comprises inserting the unique sequence number in front of any previously appended electronic signature information.

19. The system according to claim 16, wherein the file tracking program is further configured to store the electronic signature information of the sending node and the electronic signature information of the receiving node corresponding to the electronic file on encryption signature repository.

20. A computer implemented method comprising:
receiving a request to transfer an electronic file via a communication network;
sending, using a computer system, a request to an encryption signature repository comprising a database for an encryption signature including public and private keyed encryption data associated with a receiving node of the electronic file;
receiving the requested encryption signature and appending the encryption signature as electronic signature information onto a portion of the electronic file to be transferred with the electronic file to the receiving node; and
sending, using the computer system, the electronic signature information to the encryption signature repository to be stored in association with identification information corresponding to the electronic file.

21. A computer implemented method comprising:
receiving a request from a client application for electronic signature information associated with a receiving node, the request including information corresponding to an electronic file to be transferred from a sending node to the receiving node with the electronic signature information including public and private keyed encryption data associated with the receiving node appended thereto;
providing, using a computer system, the electronic signature information to the client application; and
storing the electronic signature information in association with identification information for the electronic file.

\* \* \* \* \*